United States Patent Office 3,419,567
Patented Dec. 31, 1968

3,419,567
HERBICIDES
Johannes Wijma, Weesp, Netherlands, assignor to North American Philips Company, Inc., New York, N.Y., a corporation of Delaware
No Drawing. Continuation-in-part of application Ser. No. 294,726, June 12, 1963. This application Feb. 26, 1965, Ser. No. 435,736
Claims priority, application Netherlands, July 12, 1962, 280,889
8 Claims. (Cl. 260—294.8)

This invention relates to new and novel compounds particularly useful as herbicides.

This case is a continuation-in-part of my copending U.S. patent application Ser. No. 294,726, filed June 12, 1963.

Many herbicidal compounds are known of varying effectiveness. One of the difficulties however, with the practical use of most of the known herbicidal compounds lies in the fact that their herbicidal activities are not sufficiently specific. Thus in agricultural practice there are few herbicidal compounds that may be satisfactorily employed as most of the known herbicidal agents damage the desired crop to the same extent as they damage the undesired weeds.

A principal object of my invention, therefore, is to provide new and novel herbicidal compounds.

Another object of my invention is to provide new and novel herbicidal compounds that are selective in their herbicidal activities.

These and other objects of my invention will be apparent from the description that follows.

According to my invention I have prepared novel halogenated thiobenzamide compounds of the formula:

(1) 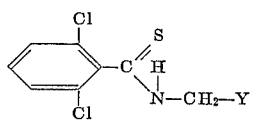

wherein X is a member selected from the group consisting of hydroxy, alkoxy of 1 to 5 carbon atoms, the group

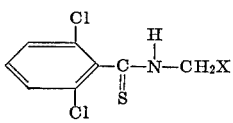

wherein $R_1$ and $R_2$ each represent alkyl of 1 to 5 carbon atoms and N together with $R_1$ and $R_2$ represent pyridyl and pyrryl.

These novel chlorinated thiobenzamides of my invention have useful herbicidal activities and may be employed to destroy not only young plants but also undesired older weed plants. Further, the novel compounds of my invention may be used in pre-emergent as well as postemergent applications.

The compounds of my invention may be prepared according to methods known for the preparation of such similar compounds or by methods analogous thereto.

The thiobenzamides of my invention wherein X represents an alkoxy group, may be prepared, for example, by causing a compound of the formula:

(2) 

in which Y represents a halogen atom, preferably a chlorine atom, or a hydroxy group, to react with an alcohol having 1 to 5 carbon atoms and an alkyl halide respectively, preferably an alkylchloride, having 1 to 5 carbon atoms, possibly in the presence of metallic sodium or a halogen binder, for example, silver ions.

The compounds of my invention, wherein X represents a

group, may be prepared, for example, by causing a compound of the Formula 2 to react with an amine of the formula

in which formula $R_1$ and $R_2$ represent an alkyl group having 1 to 5 carbon atoms or, together a saturated or unsaturated alkylene group having 4 to 5 carbon atoms.

In the case that $R_1$, $R_2$ and N together constitute a pyridine ring, the compounds of my invention can be prepared by causing a compound of Formula 2, in which Y is a halogen atom, preferably a chlorine atom, to react with pyridine.

The novel thiobenzamides of my invention wherein X is hydroxyl may be prepared by reacting a corresponding acid chloride with hexamethylene tetramine or by the simultaneous action of ammonia and formaldehyde or paraformaldehyde on a corresponding acid chloride. These novel compounds of my invention, however (wherein X is hydroxy), are preferably prepared by reacting a suitable dichlorothiobenzamide with formaldehyde or paraformaldehyde and especially with formalin.

The preparation and methods of employing the novel compounds of my invention will now be explained in greater detail with reference to the following examples:

Example 1

A mixture of 175 g. of 2,6-dichlorothiobenzamide, 1 litre of 36% by weight of formalin, 500 cc. of dioxane and 90 cc. of 2 N solution of caustic soda was stirred at room temperature for 2 hours. The resulting solution was homogeneous. The homogeneous mixture was poured in 2 litres of an aqueous solution of common salt. The precipitated oil was extracted four times with 250 cc. of ether. The collected extracts were washed with 600 cc. of a 2 N solution of caustic soda and then with water. After condensation by evaporation to about 500 cc. the ethereal solution was washed four times with 75 cc. of 2 N solution of caustic soda.

The collected caustic soda extracts were washed with 150 cc. of ether, after which the ether was removed by evaporation under reduced pressure at from 20° C. to 25° C. and the condensate was cooled to 10° C. After filtration, 200 cc. of concentrated hydrochloric acid were added while stirring. The resulting mixture was stirred for one hour at a temperature of from 15° C. to 20° C. and then allowed to stand. After standing 15 hours the precipitated oil had entirely solidified; the solid substance was drawn off, washed with water several times and dried. The yield of N-hydroxymethyl-2,6-dichlorothiobenzamide was 163 g. (81% of the theoretical yield). Melting point 112° C.–115° C.

Example 2.—N-methoxymethyl-2,6-dichlorothiobenzamide 5.08 grams of N-chloromethyl-2,6-dichlorothiobenzamide (prepared from N-hydroxymethyl-2,6-dichlorothiobenzamide by means of PCl$_5$) were suspended in 20 ml. of acetone.

3.06 grams of pulverized silver nitrate and 30 ml. of methanol were simultaneously added to this suspension within 5 to 10 minutes while stirring, the temperature being maintained at 20–25° C. Then the mixture was stirred for another 15 minutes and then poured on 2.1 g. of soda. The pH had become 7. The solvent was distilled off for the greater part. The residue was cooled to 0° C. and the crystallized substance was filtered off. The crystals were extracted with benzene. After the benzene solution had been evaporated to 5 ml., a solid was precipitated by adding petroleum ether. Yield: 1.83 g. Melting range: 133–139° C. After one crystallization from isopropanol the melting range was 142–144° C.

Example 3.—N-ethoxymethyl-2,6-dichlorothiobenzamide 118.0 g. of N-hydroxymethyl - 2,6 - dichlorothiobenzamide were mixed with 500 ml. of dry benzene. 66.0 g. of thionylchloride were added dropwise while stirring within 15 minutes. The clear benzene solution was heated to boiling on the water bath for 15 minutes. After having cooled the reaction mixture to 10° C., 125 ml. of absolute ethanol were added in 5 minutes. Then stirring was continued at room temperature for another 30 minutes.

The solution was filtered, evaporated in vacuo to 200 ml. and replenished with another 200 ml. of benzene.

The mixture was extracted 3 times with 100 ml. of 2 N KOH after which the alkaline solution was acidified with concentrated hydrochloric acid, while cooling. The crystalline product formed was filtered off and dried in air. Yield: 51 g. Melting point 114–115° C.

Example 4.—N-n-propoxymethyl-2,6-dichlorothiobenzamide 14.2 g. of N-hydroxymethyl-2,6-dichlorothiobenzamide was mixed with 60 ml. of dry benzene. 5.1 ml. of thionylchloride were added dropwise to this mixture in 5 minutes. The resulting solution was then boiled under reflux for 15 minutes, cooled to 10° C. and diluted wtih 20 ml. of n-propanol. After 15 hours the solution was washed once with water and then 10 times with totally 500 ml. of 2 N potassium hydroxide solution. The extracts were combined, treated with carbon and carefully neutralized with concentrated hydrochloric acid while stirring and cooling in ice water. The precipitate was filtered off and crystallized from a mixture of 1 part of benzene and 2 parts of petroleum ether 40–60. Yield: 2.5 g. Melting range: 77–85° C. After recrystallization from ethanol/water 1:2. Melting point 88–91° C.

Example 5.—N-isopropoxymethyl-2,6-dichlorothiobenzamide 14.2 g. of N-hydroxymethyl-2,6-dichlorothiobenzamide were mixed with 60 ml. of dry benzene. 5.1 ml. of thionylchloride were added dropwise to this mixture in 5 minutes. The resulting solution was boiled under reflux for 15 minutes, cooled to 10° C. and diluted with 20 ml. of isopropanol. After 15 hours the solution was washed once with water and then 5 times with 20 ml. of 2 N potassium hydroxide solution. The extracts were combined, treated with carbon and then carefully neutralized with concentrated hydrochloric acid while stirring and cooling in ice water. The precipitate was vacuum filtered off and crystallized from approximately 20 ml. of a mixture of 1 part of benzene and 2 parts of petroleum ether 40–60. Yield: 3.0 g. Melting range: 110–122° C.

Example 6.—N-methoxymethyl-2,6-dichlorothiobenzamide 25 ml. of methanol in which 0.85 gr. of sodium had been dissolved, were added at 15–20° C., while stirring, within 20 minutes to a solution of 8.9 g. of N-chloromethyl-2,6-dichlorothiobenzamide in 30 ml. of acetone. After 75 minutes the reaction mixture was diluted with 150 ml. of diethylether. The solution was washed with dilute acetic acid to weakly acid. Then the solution was extracted 5 times, each time with 20 ml. of 2 N sodium hydroxide. The combined alkaline extracts were purified with active carbon at room temperature. The mixture was filtered and the filtrate was carefully acidified with hydrochloric acid to Ph 2 to 3 while cooling in an ice bath. The crystallized product was isolated and dried in air. Yield: 0.93 g. Melting range: 138–142° C.

Example 7.—N-(dimethylaminomethyl)-2,6-dichlorothiobenzamide 20.6 g. of 2.6-dichlorothiobenzamide were stirred at a temperature of 20° C. with a mixture of 20 ml. of 25% dimethylamine solution, 10 ml. of 40% formaline and 125 ml. of dioxane. After the mixture had been left to stand at 20° C. for 15 hours, it was poured into water. The resultant precipitate was filtered off and dried. Yield: 25 g. Melting point 147–149° C.

Example 8.—N-(pyridiniummethyl)-2,6-dichlorothiobenzamide chloride 23.6 g. of N-hydroxymethyl-2,6-dichlorothiobenzamide were mixed with 100 ml. of benzene. To this mixture there were added dropwise while stirring, and within 10 minutes, 13.5 g. of thionylchloride. The benzene solution was heated on the water bath for 15 minutes. After the reaction mixture had been cooled to 10° C. 15 g. of pyridine were added.

The resulting precipitate was sucked off and dried in vacuo. Yield: 30 g. melting point 185–187° C.

The compounds according to the invention have a strong pre-emergence action on various weeds. This action is shown in the following experiment in which seeds of various weeds were sprayed with an aqueous solution or suspension of one of the compounds. After a few days the percentage of the seeds that had not germinated was determined. In Table I the results of an experiment are given in which the seeds were treated with a quantity of substance of the following formula, which, in practice, corresponds to 10 kg./ha.

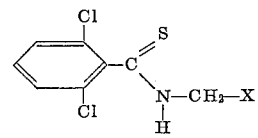

TABLE I

| X | White mustard | Annual meadow grass | Chickweed | Cress | Millet | Wild oats |
| --- | --- | --- | --- | --- | --- | --- |
| —N(CH$_3$)$_2$ | ++ | ++ | ++ | ++ | ++ | ++ |
| N⁺⟨⟩Cl— | ++ | ++ | ++ | ++ | ++ | ++ |
| OCH$_3$ | ± | ++ | ++ | + | ++ | ++ |
| OC$_2$H$_5$ | + | ++ | ++ | + | ± | |
| O(CH$_2$)$_2$CH$_3$ | ++ | ++ | ++ | ++ | ± | |
| OCH(CH$_3$)$_2$ | ++ | ++ | ++ | ++ | ++ | |

++ means 100% inhibition of the seed germination.
+ means 80–100% inhibition of the seed germination.
± means 10–80% inhibition of the seed germination.

It has been found in post-emergence experiments that the compounds according to the invention also have an interesting action on young and fullgrown plants. With some compounds of my invention weeds in vegetation can be killed without the vegetation being damaged noteworthily.

The compound of Formula 1, in which X represents an isopropoxy group and $n=0$, has been found to be suitable for killing nettles in dwarf French bean.

The post-emergence action is shown in the following experiment in which various seeds and vegetation were sprayed with a solution or suspension of compounds of my invention in acetone in a quantity corresponding to 10 kg./ha. After some time the damage done to the plants was estimated and evaluated with a cipher from 0 to 6, these ciphers having the following meanings:

0 = no damage
1 = up to 1/10 part of the leaves burned
2 = 1/10–1/3 part of the leaves burned
3 = 1/3–2/3 part of the leaves burned
4 = 2/3–9/10 part of the leaves burned
5 = 9/10 part of the leaves or more burned
6 = plant died

TABLE II

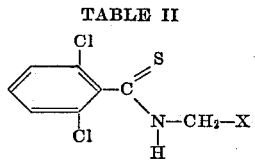

| X | Dwarf French bean | Oat | Chickweed | Nettle | Groundsel |
|---|---|---|---|---|---|
| —N(CH$_3$)$_2$ | 2 | 2 | 4 | | |
| N⁺⟨⟩Cl— | 3 | 2 | 4 | | |
| OCH$_3$ | 0 | 2 | 2 | | |
| OC$_2$H$_5$ | 3 | 2 | 3 | | |
| O(CH$_2$)$_2$CH$_3$ | 3 | 2 | 4 | 6 | 4 |
| OCH(CH$_3$)$_2$ | 1 | 2 | 2 | 6 | 4 |

The compound N-hydroxymethyl-2,6-dichlorothiobenzamide was found to be particularly useful in that it was able to destroy dicolyledonous weeds in wheat and barley without harming these cereal crops. Thus this compound can be used in the early spring to act as a pre-emergent weed killer for winter wheat.

The production of a herbicidal composition in accordance with the invention may be effected in the manners known for such compositions. For example, an active substance may be mixed with a powdered inert carrier, such as chalk, dolomite, kaolin, china clay or attapulgite or dissolved or dispersed in an inert solvent, such as toluene, xylene, aliphatic, alicyclic or aromatic ketones, for example acetone, methylethyl ketone or cyclohexanone, or mixtures thereof with hydrocarbons, if desired with the addition of surface-active substances and dispersion agents. It may also be mixed with artificial manures.

A dust may be produced by mixing 5 parts by weight of an active ingredient with 95 parts by weight of kieselguhr and grinding the mixture.

A wettable powder may be produced by intimately mixing 20 parts by weight of an active ingredient with 5 parts by weight of oleylamidomethyltaurate, 10 parts by weight of calciumlignin sulphonate and 65 parts by weight of chalk and grinding the resulting mixture.

Miscible oils containing from 5–30% and preferably from 10–20% of active ingredient and from 5–10% of ionogenic or non-ionogenic emulsifying agents or mixtures thereof may be produced by dissolving these ingredients in organic solvents, for example, aliphatic or aromatic ketones, such as acetone and cyclohexanone, if desired mixed with aromatic hydrocarbons, for example toluene and xylene.

A dispersion may be produced by pouring into water a miscible oil which, for example, is produced by mixing 25 parts by weight of active ingredient, 10 parts by weight of polyoxyethylenesorbitan fatty acid ester, 25 parts by weight of acetone and 30 parts by weight of methyl-ethylketone.

While I have described my invention in connection with specific embodiments and applications, other modifications thereof will be readily apparent to those skilled in this art without departing from the spirit and scope of the invention as defined in the appended claims.

What I claim is:

1. A compound of the formula:

wherein X is a member selected from the group consisting of hydroxy, alkoxy of 1 to 5 carbon atoms, the group $$\diagdown N \diagup \begin{matrix} R_1 \\ R_2 \end{matrix}$$

wherein R$_1$ and R$_2$ is each alkyl of 1 to 5 carbon atoms and R$_1$, R$_2$ together with N is pyrryl and pyridinium chloride.

2. N-methoxymethyl-2,6-dichlorothiobenzamide.
3. N-ethoxymethyl-2,6-dichlorothiobenzamide.
4. N-n-propoxymethyl-2,6-dichlorothiobenzamide.
5. N-isopropoxymethyl-2,6-dichlorothiobenzamide.
6. N-(dimethylaminomethyl) - 2,6 - dichlorothiobenzamide.
7. N-(pyridiniummethyl) - 2,6-dichlorothiobenzamidechloride.
8. N-hydroxymethyl-2,6-dichlorothiobenzamide.

References Cited

UNITED STATES PATENTS

| 2,201,170 | 5/1940 | Hanford | 260—551 |
| 2,277,821 | 3/1942 | Ericks | 260—551 |
| 2,744,819 | 5/1956 | Toorman | 71—2.6 |
| 2,829,038 | 4/1958 | Ochsner | 71—2.6 |
| 2,936,323 | 5/1960 | Eden | 71—2.6 |
| 2,577,969 | 12/1951 | Jones | 71—2.6 |

HENRY R. JILES, *Primary Examiner.*

H. I. MOATZ, *Assistant Examiner.*

U.S. Cl. X.R.

260—551, 326.9; 71—100

UNITED STATES PATENT OFFICE
CERTIFICATE OF CORRECTION

Patent No. 3,419,567                                                             December 31, 1968

Johannes Wijma

It is certified that error appears in the above identified patent and that said Letters Patent are hereby corrected as shown below:

Column 2, line 71, "3.06" should read -- 3.6 --.

Signed and sealed this 14th day of April 1970.

(SEAL)
Attest:

Edward M. Fletcher, Jr.

Attesting Officer

WILLIAM E. SCHUYLER, JR.

Commissioner of Patents